(12) United States Patent
Fort, Jr.

(10) Patent No.: US 11,227,503 B2
(45) Date of Patent: Jan. 18, 2022

(54) METHOD OF MUSIC INSTRUCTION

(71) Applicant: Music Academy Success, LLC, Irmo, SC (US)

(72) Inventor: Thomas M. Fort, Jr., Irmo, SC (US)

(73) Assignee: Music Academy Success, LLC, Irmo, SC (US)

( * ) Notice: Subject to any disclaimer, the term of this patent is extended or adjusted under 35 U.S.C. 154(b) by 0 days.

(21) Appl. No.: 17/147,669

(22) Filed: Jan. 13, 2021

(65) Prior Publication Data

US 2021/0134169 A1    May 6, 2021

Related U.S. Application Data

(63) Continuation of application No. 15/059,593, filed on Mar. 3, 2016, now abandoned.

(60) Provisional application No. 62/129,430, filed on Mar. 6, 2015.

(51) Int. Cl.
*G09B 5/00* (2006.01)

(52) U.S. Cl.
CPC ..................... *G09B 5/00* (2013.01)

(58) Field of Classification Search
CPC ...................................................... G09B 5/00
See application file for complete search history.

(56) References Cited

U.S. PATENT DOCUMENTS

| | | | |
|---|---|---|---|
| 5,310,349 A * | 5/1994 | Daniels | G09B 7/00 345/156 |
| 7,157,638 B1 * | 1/2007 | Sitrick | G10H 1/0008 84/477 R |
| D542,687 S | 5/2007 | Brown | |
| D546,227 S | 7/2007 | Brown | |
| D587,157 S | 2/2009 | Hawk | |
| D623,550 S | 9/2010 | Weber | |
| 8,468,061 B2 * | 6/2013 | Sharma | G06Q 30/0224 705/26.1 |
| 8,487,173 B2 * | 7/2013 | Emmerson | G10H 1/0025 84/601 |
| 8,662,894 B2 | 3/2014 | Paratore et al. | |

(Continued)

OTHER PUBLICATIONS

Musical Ladder System retrieved from Internet Jul. 23, 2019 at https://www.valleyconservatory.com.

(Continued)

*Primary Examiner* — Robert W Horn
(74) *Attorney, Agent, or Firm* — Ashley Law Firm P.C.; Stephen S. Ashley, Jr.

(57) ABSTRACT

A method of music instruction can comprise a system in which students receive a different colored wristband upon completing various intervals of training. Each wristband can provide a sense of accomplishment to the student and provide an incentive for the student to continue his/her training. Students can receive the first wristband upon completing three months of lessons, and a different wristband after completing each three-month interval thereafter until reaching eighteen months. After eighteen months, a different wristband can be awarded at each six-month interval until completing thirty-six months of lessons. Students can also receive certificates and trophies in tandem with the wristbands upon completing certain intervals of training.

20 Claims, 5 Drawing Sheets

(56) References Cited

U.S. PATENT DOCUMENTS

| | | | | |
|---|---|---|---|---|
| 8,884,146 B2* | 11/2014 | Paterson | ............... | G09B 15/00 |
| | | | | 84/470 R |
| D777,869 S | 1/2017 | Wynalda, Jr. | | |
| D881,738 S | 4/2020 | Fort, Jr. | | |
| D884,540 S | 5/2020 | Tse | | |
| 2002/0043077 A1 | 4/2002 | Boyadjian | | |
| 2006/0179542 A1 | 8/2006 | Pierce | | |
| 2010/0285283 A1 | 11/2010 | Kingsbury | | |
| 2012/0233084 A1 | 9/2012 | Sardonis et al. | | |
| 2013/0246317 A1 | 9/2013 | Martin | | |
| 2013/0262298 A1 | 10/2013 | Morley | | |
| 2016/0225278 A1* | 8/2016 | Leddy | ...................... | G09B 5/06 |
| 2016/0260344 A1* | 9/2016 | Fort, Jr. | ................... | G09B 5/00 |
| 2018/0293905 A1* | 10/2018 | Benz | ........................ | G09B 5/00 |
| 2020/0302817 A1* | 9/2020 | Williams | ................ | G09B 5/10 |
| 2021/0134169 A1* | 5/2021 | Fort, Jr. | ................... | G09B 5/00 |

OTHER PUBLICATIONS

Owner of local music schools develops new system for teaching students retrieved from Internet Jun. 10, 2020 from URL: https://www.thestate.com/living/article96945767.html.

Quarter Note Music Ring retrieved from Internet Jun. 9, 2020 from URL: https://www.amazon.com/Zealot-Jewelry-Tungsten-Quarter-Polished/dp/B07PPX-XBYP/?tag=daedelusmusic-20&th=1.

New Ink Filled Logo Music Note Silicone Wristband retrieved from Internet Jun. 9, 2020 from URL: https://www.aliexpress.com/item/32910047874.html.

* cited by examiner

MUSICAL LADDER SYSTEM 10

| | | |
|---|---|---|
| Master = 36 months<br>* And Trophy! | MASTER 28 | MASTER 38 |
| Maestro = 30 months | MAESTRO 27 | MAESTRO 37 |
| Prodigy = 24 months<br>* And Trophy! | PRODIGY 26 | PRODIGY 36 |
| Vivace = 18 months | VIVACE 25 | VIVACE 35 |
| Allegro = 15 months | ALLEGRO 24 | ALLEGRO 34 |
| Rock Star = 12 months<br>* And Trophy! | ROCK STAR 23 | ROCK STAR 33 |
| Musician = 9 months | MUSICIAN 22 | MUSICIAN 32 |
| Junior Apprentice = 6 months<br>* And Trophy! | JUNIOR APPR 21 | JUNIOR APPR 31 |
| Apprentice = 3 months | APPRENTICE 20 | APPRENTICE 30 |

FIGURE 1

MUSICAL LADDER SYSTEM
100
| Level | Ring 1 | Ring 2 |
|---|---|---|
| Prima = 60 months<br>* And Trophy! |  142 |  152 |
| Superstar = 54 months | 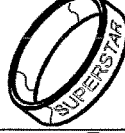 141 |  151 |
| Champion = 48 months<br>* And Trophy! |  140 |  150 |
| Superior = 42 months |  129 |  139 |
| Master = 36 months<br>* And Trophy! |  128 | 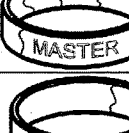 138 |
| Maestro = 30 months |  127 |  137 |
| Prodigy = 24 months<br>* And Trophy! |  126 |  136 |
| Vivace = 18 months |  125 |  135 |
| Allegro = 15 months |  124 |  134 |
| Rock Star = 12 months<br>* And Trophy! |  123 |  133 |
| Musician = 9 months |  122 |  132 |
| Song Bird = 6 months<br>* And Trophy! | 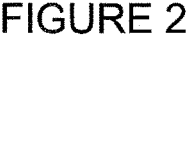 121 |  131 |
| Apprentice = 3 months | 120 | 130 |
FIGURE 2

METHOD OF MUSIC INSTRUCTION

CROSS REFERENCE TO RELATED APPLICATIONS

This application is a continuation of U.S. patent application Ser. No. 15/059,593, filed Mar. 3, 2016, which claims priority to U.S. Provisional Patent Application No. 62/129,430, filed Mar. 6, 2015. Both of said applications are incorporated herein by reference.

TECHNICAL FIELD

The present invention relates to music instruction. In an embodiment of the invention, students are awarded physical decorations, such as various distinctively colored and/or labeled wristbands, upon completion of various levels of musical training.

BACKGROUND

Of the many children who begin lessons on a musical instrument, it is believed that the majority will quit within the second month of beginning lessons. Attrition in the music teaching industry is generally very high. Retaining students is typically vital to the success of a music school. The need to retain music students once obtaining them is a serious economic issue for commercial music schools and independent teachers. Keeping students interested and motivated is typically the most important factor in determining the success or failure of a music school.

SUMMARY

Therefore, one object of the present invention is to provide a method of teaching music that minimizes student attrition by providing incentives to students to continue their lessons. These and other objects of the invention can be achieved in various embodiments of the invention described herein.

An embodiment of the invention comprises a "MUSICAL LADDER SYSTEM", in which students receive a different colored wristband upon completing various intervals of training. Each wristband can provide a sense of accomplishment to the student and provide an incentive for the student to continue his/her training. Students can receive the first wristband upon completing three months of lessons, and a different wristband after completing each three month interval thereafter until reaching eighteen months. After eighteen months, a different wristband can be awarded at each six-month interval until reaching a "master" status at thirty-six months. Students can also receive certificates and trophies in tandem with the wristbands upon completing certain intervals of training. The trophies can be up to three feet in height, and inspire the students to stay with the music school.

According to another embodiment of the invention, the MUSICAL LADDER SYSTEM can include a parent portal software in which parents of students can log in and view their child's progress for the next award coming up, teacher notes, important dates, and their child's 'status' on the MUSICAL LADDER.

Another embodiment of the invention comprises a method of instruction comprising the steps of providing an initial lesson to a student, scheduling a first achievement milestone on a date sixty to one hundred days after the initial lesson, and providing an award to the student upon reaching the first achievement milestone.

According to another embodiment of the invention, the first achievement milestone can be completion of a predetermined number of lessons by the student.

According to another embodiment of the invention, the first achievement milestone can be a test that must be taken and passed by the student.

According to another embodiment of the invention, the first achievement milestone is scheduled for ninety days after the initial lesson.

According to another embodiment of the invention, a second achievement milestone can be scheduled on a date ninety days after the first achievement milestone.

According to another embodiment of the invention, the award can be a wristband.

According to another embodiment of the invention, the wristband includes distinctive indicia thereon.

According to another embodiment of the invention, the distinctive indicia can include alphanumeric characters.

According to another embodiment of the invention, the distinctive indicia can include a decorative logo.

According to another embodiment of the invention, a method of music instruction comprises providing an initial music lesson to a student, scheduling a first achievement milestone about three months after the initial music lesson, and providing an award to the student upon reaching the first achievement milestone.

According to another embodiment of the invention, a student can reach the first achievement milestone by completing a predetermined number of lessons and/or passing a predetermined test.

According to another embodiment of the invention, a second achievement milestone can be scheduled for three months after the first achievement milestone, and a third achievement milestone can be scheduled for three months after the second achievement milestone.

According to another embodiment of the invention, a first plurality of additional achievement milestones can be scheduled beginning three months after the first achievement milestone and continue every three months until eighteen months after the initial music lesson.

According to another embodiment of the invention, a second plurality of additional achievement milestones can be scheduled beginning two years after the initial music lesson, and continue every six months until five years after the initial music lesson.

According to another embodiment of the invention, a third plurality of additional achievement milestones can be scheduled beginning six years after the initial music lesson and continuing every year until ten years after the initial music lesson.

According to another embodiment of the invention, the award can be a wristband having distinctive indicia thereon. The distinctive indicia can include alphanumeric characters and/or a decorative logo.

Another embodiment of the invention comprises a non-transitory computer readable storage medium having programming instructions that, when executed, causes a computer processor to perform a method of operating a music school. The method can include maintaining student retention data comprised of how long each of the plurality of music students has taken lessons from the music school, and maintaining instrument data comprised of which instrument each of the plurality of music students has taken lessons on from the music school. The student retention data is cross-referenced with the instrument data to produce an instrument retention report showing an average duration of lessons for each instrument.

According to another embodiment of the invention, the method includes maintaining student progress data for each of the plurality of music students. The student progress data can be progress toward an award, teacher comments, and deadlines.

According to another embodiment of the invention, a parent portal can be provided by which parents of the plurality of music students can log in via the Internet and view the student progress data for their child.

According to another embodiment of the invention, student source data can be received and maintained for each of the plurality of music students. The student source data is a source by which each of the plurality of music students has been introduced to the music school, such as personal referral, walk in, Internet website, social media, radio advertising, television advertising, and print advertising. The student source data and the student retention data are cross-referenced to produce a student source report showing an average duration of lessons for each source.

According to another embodiment of the invention teacher data for each of the plurality of music students is maintained. The teacher data is the name of the teacher for each of the plurality of music students. The teacher data and the student retention data are cross-referenced to a teacher retention report showing an average duration of lessons for each teacher.

BRIEF DESCRIPTION OF THE DRAWINGS

FIG. 1 is a schematic view illustrating a method of music instruction according to a preferred embodiment of the invention;

FIG. 2 is a schematic view illustrating a method of music instruction according to another preferred embodiment of the invention;

DETAILED DESCRIPTION OF PREFERRED EMBODIMENTS

Figure 3:
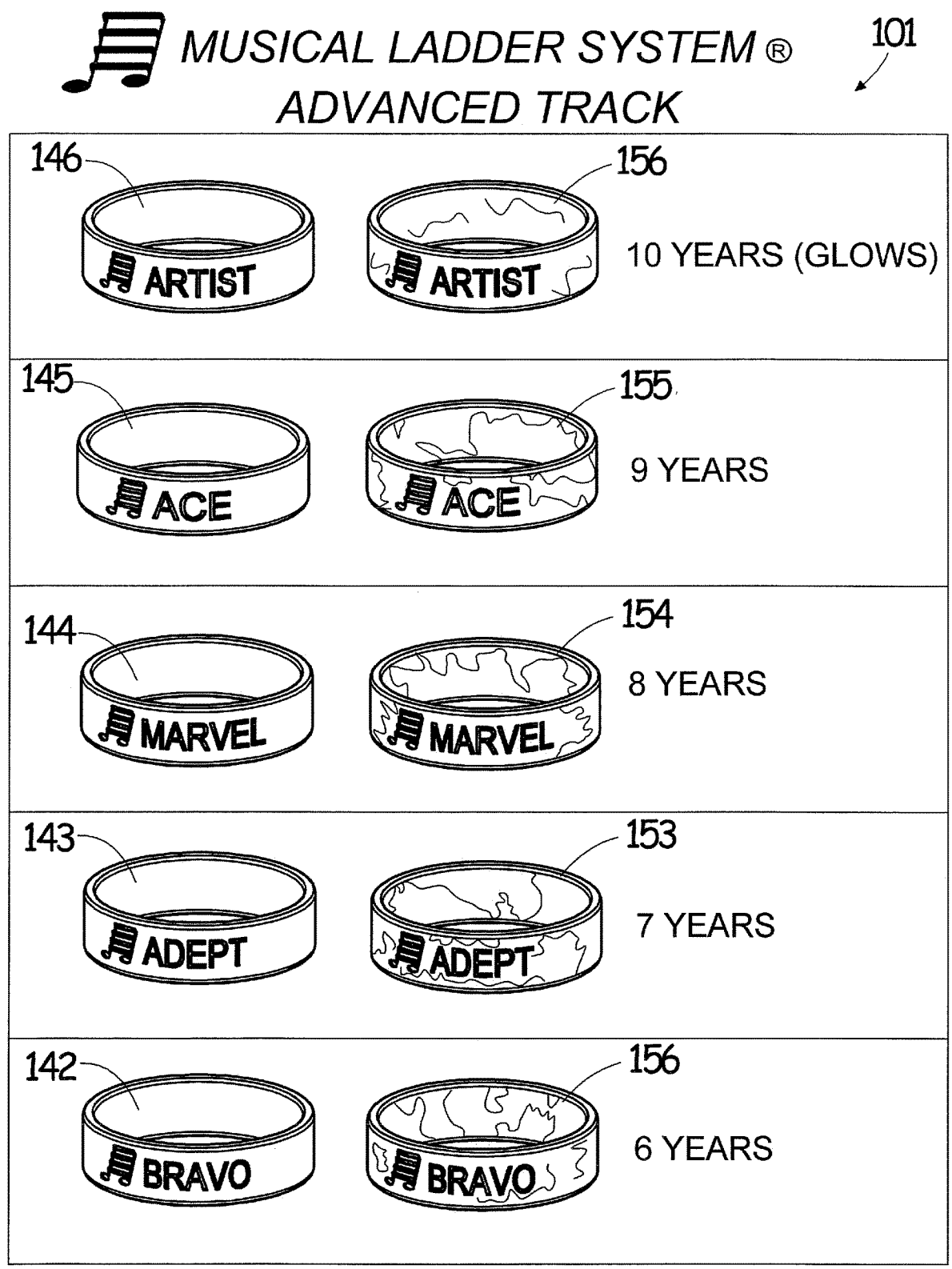
FIG. 3 is a schematic view illustrating a method of music instruction according to another preferred embodiment of the invention.

A method of music instruction according to a preferred embodiment of the invention is illustrated in FIG. 1, and shown generally at reference numeral 10. The method is referred to herein as a "MUSICAL LADDER SYSTEM." In accordance with the MUSICAL LADDER SYSTEM 10, students are awarded physical decorations, such as various distinctively colored and/or labeled wristbands 20 upon completion of various levels of musical training. Each wristband 20 awarded provides a sense of accomplishment to the student and provides an incentive for the student to continue his/her music lessons.

A student receives a distinct decorative wristband upon completing various intervals of training. Each wristband for completing each particular level of training can have a distinctive color and/or words printed thereon.

As shown in FIG. 1, a student receives the first wristband 20, 30 upon completing the first three months of lessons. The wristband awarded to the student for completing three months of instrumental music lessons can have "APPRENTICE" written thereon, as shown at reference numeral 20 in FIG. 2. Alternatively, a student taking voice lessons can receive a wristband that has "SONG BIRD." A different wristband is awarded after completing each three month interval thereafter until reaching eighteen months.

As shown in FIG. 1, the student can receive a wristband 21, 31 labeled "JUNIOR APPRENTICE" upon completing six months of lessons. Upon completing nine months of lessons, the student can receive a wristband 22, 32 labeled "MUSICIAN." Upon completing twelve months of lessons, the student can receive a wristband 23, 33 labeled "ROCK STAR." The student can also receive a trophy at twelve months. Upon completing fifteen months of lessons, the student can receive a wristband 24, 34 labeled "ALLEGRO." Upon completing eighteen months of lessons, the student can receive a wristband 25, 35 labeled "VIVACE."

After eighteen months, a different wristband is awarded at each six-month interval until reaching "MASTER" status at thirty-six months. As shown in FIG. 1, the student can receive a wristband 26, 36 labeled "PRODIGY" upon completing twenty-four months of lessons. Upon completing thirty months of lessons, the student can receive a wristband 27, 37 labeled "MAESTRO." Upon completing thirty-six months of lessons the student receives the "MASTER" wristband 28, 38. The student can also receive a trophy at this point.

The wristbands can be made of silicone rubber or other suitable materials. The assigned names, such as APPRENTICE, MUSICIAN, etc., can be debossed, embossed, printed, or laser-engraved onto the wristband, or affixed thereon by other suitable means. Preferably, the wristbands are made of silicone and the assigned names are debossed with white ink. Alternatively, the wristbands can be made of a metal such as gold, silver, nickel or platinum, or other suitable material.

Each wristband can be a single distinct color, as represented by the wristbands shown at reference numerals 20-28 in FIG. 1, or can be multi-colored as represented by the wristbands shown at reference numerals 30-38 in FIG. 1. Preferably, different colors are used, and each uni-colored wristband 20-28 is a different color. Upon completing each level of training, the student is given the choice of a uni-colored wristband 20-28 or the corresponding multi-colored wristband 30-38. For example, upon completing the first three months of music lessons the student is given the choice of either the solid colored wristband 20 or the corresponding multi-colored wristband 30. Alternatively, the student can receive both the single colored wristband 20 and the corresponding multi-colored wristband 30 upon completion of each particular interval of training. Preferably, a substantial portion of each of the multi-colored wristbands 30-38 is the same color as its corresponding single colored wristband 20-28. For example, single colored wristband 20 can be red, and its corresponding multi-colored wristband 30 can be substantially red with black sections or lines.

In an alternative embodiment, the wristbands can be awarded based on the amount of time of lessons that have been completed by the student in conjunction with specific tests that must be passed by the student at each specific interval of time. For example, upon completing three months of lessons the student is given his or her first musical test, which must be successfully passed by the student in order to get the three month "APPRENTICE" wristband 20, 30. Likewise, after completing six months of lessons, the student is given a second test, having a more advanced degree of difficulty than the previous test given at the three month juncture. If the student successfully passes the second test, he or she is awarded the six-month "SENIOR APPRENTICE" wristband.

The system 10 can include a parent portal software in which parents of students can log in and view their child's progress for: the next award coming up, teacher notes, important dates, and their child's 'status' on the MUSICAL LADDER.

It is critical that the first test and reward be provided when the student has completed three months of lessons. Applicant has found that a majority of music students become frustrated and give up on learning their instrument within the first two months of lessons. As such, a goal and reward provided at the three month mark, gives an incentive to students to persevere through the critical second month, thereby dramatically increasing the rate of retention. At the first training session, the student's first test should be scheduled with the instructor for three months after the first session. This test can be reinforced by the parent portal that parents and students can access to anticipate and prepare for the first three-month test. Then students prepare for tests every three months or six months thereafter.

Applicant has determined that the above time benchmarks (three months, six months, nine months, twelve months, fifteen months, eighteen months, twenty-four months, thirty months and thirty-six months) are critical to maximizing music student retention.

Student retention can be vital for a music school, as it results in students taking more lessons over a longer period of time thereby increasing revenue. Increased retention rates also increases the number of referrals of new students. The MUSICAL LADDER SYSTEM 10 can provide a competitive marketing advantage as parents seek out schools that reward students in this unique way.

The MUSICAL LADDER SYSTEM 10 can be a significant market game changer for the music lesson industry as children are often unable to communicate with their parents due to their maturity as to "how" they are progressing in their musical training. The MUSICAL LADDER SYSTEM 10 solves this problem via its strategically timed award achievement calendar and online parent notification system.

FIG. 2 illustrates a method of musical instruction according to another preferred embodiment of the invention. A student receives the first wristband 120, 130 upon completing the first three months of lessons, and the wristband awarded to the student for completing three months of instrumental music lessons can have "APPRENTICE" written thereon, as shown in FIG. 2. The student can receive a wristband 121, 131 labeled "SONG BIRD" upon completing six months of lessons. Upon completing nine months of lessons, the student can receive a wristband 122, 132 labeled "MUSICIAN." Upon completing twelve months of lessons, the student can receive a wristband 123, 133 labeled "ROCK STAR." The student can also receive a trophy at twelve months. Upon completing fifteen months of lessons, the student can receive a wristband 124, 134 labeled "ALLEGRO." Upon completing eighteen months of lessons, the student can receive a wristband 125, 135 labeled "VIVACE."

After eighteen months, a different wristband is awarded at each six-month interval until reaching "PRIMA" status at sixty months. As shown in FIG. 2, the student can receive a wristband 126, 136 labeled "PRODIGY" and a trophy upon completing twenty-four months of lessons. Upon completing thirty months of lessons, the student can receive a wristband 127, 137 labeled "MAESTRO." Upon completing thirty-six months of lessons the student receives a wristband 128, 138 labeled "MASTER" and a trophy. Upon completing forty-two months of lessons, the student can receive a wristband 129, 139 labeled "SUPERIOR." Upon completing forty-eight months, the student can receive a wristband 140, 150 labeled "CHAMPION" and a trophy. Upon completing fifty-four months of lessons the student can receive a wristband 141, 151 labeled "SUPERSTAR." Upon completing sixty months of lessons, the student can receive a wristband 142, 152 labeled "PRIMA" and a trophy.

According to another embodiment of the invention, shown generally at reference numeral 101 in FIG. 3, the wristband awards can continue beyond five years. As shown in FIG. 3, wristband awards can be awarded on an annual basis from years six to ten. Upon completion of six years of lessons the student can receive a wristband 142, 152 labeled "BRAVO". Upon completion of seven years of lessons, the student can receive a wristband 143, 153 labeled "ADEPT." Upon completion of eight years of lessons, the student can receive a wristband 144, 154 labeled "MARVEL." Upon completion of nine years of lessons the student can be awarded a wristband 145, 155 labeled "ACE." Upon completion of ten years of lessons, the student can be awarded a wristband 146, 156 labeled "ARTIST."

Figure 4:
FIG. 4 is a perspective view of a wristband according to a preferred embodiment of the invention.

In an alternative embodiment of the invention, each wristband can include a decorative logo as shown at reference numeral 221 on wristband 222 in FIG. 4.

It should be noted that while preferred embodiments of the invention are described above as using wristbands, the invention is not so limited. Alternatively, other accessories, such as scarves, necklaces, bracelets, and rings can be used in place of the wristbands.

Another preferred embodiment of the invention comprises a method of operating a business, such as a music school. A music school owner can collect and maintain data regarding how many months each student has been a student with the school, and using this data generates "student retention" reports. The music school owner can collect and maintain data regarding which media source (e.g., Internet website, print media advertisement, radio advertisement, television advertisement, and personal referral) initially brought each student to the music school. Cross referencing this data with student retention information for each student, "media spend" reports can be generated showing how many months each student has been with the school based upon the media source that brought them to the school. The "media spend" report can provide data regarding which media sources are most effective at attracting students who remain at the school the longest, and which media sources tend to attract students with high attrition rates. As such, the "media spend" reports can provide guidance to the music school owner as to which media sources to invest resources in. For example, the media spend report may reveal that students who initially discover the music school by the school's Internet website stay with the school on average six months longer than students who discover the school by a radio advertisement.

The music school owner can collect and maintain data regarding how many months each student has been with each teacher. Using this data, "teacher retention" reports can generated, which show teachers of the school are performing at the highest level with the least student attrition.

The music school owner can collect and maintain data regarding which instrument each student is playing and cross reference that data with data regarding how many months each student has been with the school to generate "instrument retention" reports. As such, the "instrument retention" reports can show which instruments are more likely to have students with higher retention, and which instruments are likely to lead to earlier attrition. The music school owner can collect and maintain data regarding how many months all students have been with the school in order to generate "school wide retention" reports.

Another embodiment of the invention comprises a non-transitory computer readable storage medium adapted for maximizing efficiency of a music school. The non-transitory computer readable storage medium can be comprised of software comprising programming instructions that, when executed, causes a computer processor to access and analyze various data regarding the music school and generate a variety of reports relating to the music school. The reports provide guidance to the music school owner that can help maximize profitability of the music school.

Figure 5:
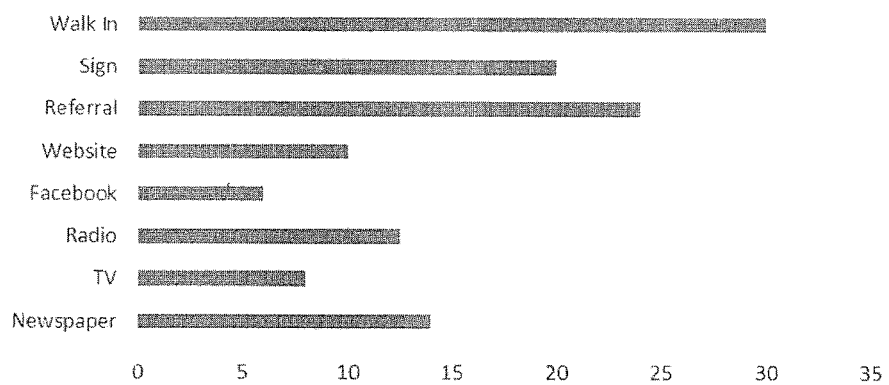
FIG. 5 is a graph according to an embodiment of the invention.

The software program includes programming for receiving data regarding how many months each student has been a student with the music school, and storing this data in a student retention database. Using this data the software causes a computer processor to generate "student retention" reports. The software program includes programming for receiving data regarding the means by which each student initially came to the music school (e.g., Internet website, social media, print media advertisement, radio advertisement, television advertisement, personal referral, walk-in), and storing this data in a student source database. The software cross references this data with student retention information for each student, and generates "student source" reports showing how many months each student has been with the school based upon the media source that brought them to the school. The "student source" report can include a graph as shown in FIG. 5. The "student source" report can provide data regarding which media sources are most effective at attracting students who remain at the school the longest, and which media sources tend to attract students with high attrition rates.

The software can receive data regarding how many months each student has been with each teacher, and store this information in a teacher retention database. Using this data the software can generate "teacher retention" reports showing which teachers of the school are performing at the highest level with the least student attrition. The software can receive data regarding which instrument each student is playing, and store this data in an instrument retention database. The software can cross reference the information in the instrument retention database with the information in the student retention database, and generate "instrument retention" reports.

The software can receive and maintain data regarding each student such as, the child's current status/level on any one of the MUSICAL LADDER systems 10, 100 described above, and other dates such as the student's next upcoming award, teacher notes/comments, and important dates/deadlines. The software can provide for a "parent portal", in which parents of students can log in via the Internet and view their child's progress toward the next upcoming award, teacher notes/comments, important dates/deadlines, and their child's 'status' on any one of the MUSICAL LADDER systems 10, 100 described above.

The software can include a "teacher portal", in which each teacher can log in, review his or her roster of students, set dates for tests, send notes to parents, send email notifications to parents, and list recital dates. The software can include an "administrators portal" by which school administrators can log in, review the roster of students, set the dates tests, send notes to parents, send email notifications to parents, list recital dates, edit teacher test dates, etc.

A method of music instruction and a method operating a music school are described above. Various changes can be made to the invention without departing from its scope. The above description of various embodiments of the invention are provided for the purpose of illustration only and not limitation—the invention being defined by the claims and equivalents thereof.

What is claimed is:

1. A computerized method for motivation and management of musical students comprising:
   a server having a server computer readable medium and configured to be accessible by a parent portal wherein the parent portal is provided to a parent using a remote computer device in communications with the server;
   a student database stored on a database computer readable medium and in communication with the server using a global communications network having a student record representing a student; and,
   a set of server computer readable instructions include on the server configured to:
   receive a student progress data record representing a current progress level of musical training of the student;
   determine a student retention data associated with the student record representing a time period the student has taken lessons from a music school;
   receive a student instrument data associated with the student record representing an instrument the student has used when taking a lesson from the music school;
   determine an instrument retention data representing an amount of time that the student takes music lessons with the instrument;
   receive a student source data record associated with the student record representing a source introducing the student to the music school wherein the source is taken from a group consisting of personal referral, walk in, website, social media, radio advertising, television advertising, print advertising and any combination thereof;
   receive a teacher data record associated with the student record representing a teacher of the student; and,
   determine a teacher retention data representing the amount of time that the student takes music lessons from the teacher.

2. The computerized method of claim 1, wherein the set of server computer readable instructions include instructions configured to generate a student retention report having a student retention rate associated with the student.

3. The computerized method of claim 1, wherein the set of server computer readable instructions include instructions configured to generate an instrument retention report having an instrument retention rate associated with the instrument.

4. The computerized method of claim 1, wherein the set of server computer readable instructions include instructions configured to generate a teacher retention report having a teacher retention rate associated with the teacher.

5. The computerized method of claim 1, wherein the set of server computer readable instructions include instructions configured to generate a music school retention report having a music school retention rate associated with the music school.

6. The computerized method of claim 1, wherein the set of server computer readable instructions include instructions configured to:
   receive a media spend,
   associate the media spend with the source, and, generate a media spend report representing a number of months the student has been with the music school according to the source.

7. The computerized method of claim 1, wherein the set of server computer readable instructions include instructions configured to generate a roster of students, receive test dates for each student, send notes to the parent through the remote computer device and display recital dates associated with the student.

8. The computerized method of claim 1, wherein the set of server computer readable instructions include instructions configured to generate student retention graph.

9. The computerized method of claim 8, wherein the set of server computer readable instructions include instructions configured to generate a student retention graph organized by the source.

10. The computerized method of claim 1, wherein the set of server computer readable instructions include instructions configured to indicate an award to provide to the student according to a length of time the student has taken music lessons with the instrument.

11. The computerized method of claim 1, wherein the current progress level of musical training of the student is taken from a set of current progress levels consisting of apprentice, junior apprentice, musician, rock star, allegro, vivace, prodigy, maestro, and master wherein each progress level represents a three-month interval.

12. The computerized method of claim 11, wherein the set of server computer readable instructions include instructions configured to indicate an award to provide to the student according to a length of time the student has taken music lessons with the instrument wherein the award includes indicia representing the current progress level.

13. A computerized method for motivation and management of musical students comprising:
a server having a server computer readable medium and configured to be accessible by a parent portal wherein the parent portal is provided to a parent using a remote computer device in communications with the server;
a student database stored on a database computer readable medium and in communication with the server using a global communications network having a student record representing a student;
a student progress data record included in the student database and associated with the student record representing a current progress level of musical training of the student;
a student instrument data record associated with the student record representing an instrument the student has used when taking music lessons;
a student source data record associated with the student record representing a source introducing the student to a music school;
a teacher data record associated with the student record representing a teacher of the student; and,
a set of server computer readable instructions include on the server configured to:
determine a student retention data associated with the student record representing an amount of time the student has taken lessons from the music school, and generate a student retention report having a student retention rate associated with the student.

14. The computerized method of claim 13, wherein:
amount of time the student has taken lessons from the music school is a first amount of time; and,
the set of server computer readable instructions include configured to determine a teacher retention data representing a second amount of time that the student takes music lessons from the teacher and generate a teacher retention report having a teacher retention rate associated with the teacher.

15. The computerized method of claim 13, wherein the set of server computer readable instructions include instructions configured to determine an instrument retention data representing the amount of time that the student takes music lessons for the instrument and generate an instrument retention report having an instrument retention rate associated with the instrument.

16. The computerized method of claim 13, wherein:
amount of time the student has taken lessons from the music school is a first amount of time; and,
the set of server computer readable instructions include configured to determine a source retention data representing a second amount of time that the student takes music lessons according to the source and generate a source retention report associated with the source.

17. The computerized method of claim 16, wherein the source is taken from a group consisting of personal referral, walk in, website, social media, radio advertising, television advertising, print advertising and any combination thereof.

18. A computerized method for motivation and management of musical students comprising:
a server having a server computer readable medium and configured to be accessible by a parent portal wherein the parent portal is provided to a parent using a remote computer device in communications with the server;
a student database stored on a database computer readable medium and in communication with the server using a global communications network having a student record representing a student;
a student progress data record included in the student database and associated with the student record representing a current progress level of musical training of the student;
a student instrument data record associated with the student record representing an instrument the student has used when taking music lessons;
a set of server computer readable instructions included on the server configured to:
determine a student retention data associated with the student record representing a time period the student has taken lessons from a music school according to a source, and
generate a student retention report having a student retention rate associated with the student and the source.

19. The computerized method of claim 18 including:
a teacher data record associated with the student record representing a teacher of the student; and,
the set of server computer readable instructions include instructions configured to generate a teacher retention report representing an amount of time the student takes music lessons from the teacher.

20. The computerized method of claim 19, wherein the set of server computer readable instructions include instructions configured to generate the teacher retention report according to the instrument.

* * * * *